United States Patent
Zhang et al.

(10) Patent No.: US 10,386,935 B2
(45) Date of Patent: Aug. 20, 2019

(54) INPUT METHOD EDITOR FOR INPUTTING NAMES OF GEOGRAPHIC LOCATIONS

(71) Applicant: Google LLC, Mountain View, CA (US)

(72) Inventors: Chi Zhang, Beijing (CN); Xiangye Xiao, Beijing (CN); Fan Yang, Beijing (CN); Fu Song, Beijing (CN)

(73) Assignee: Google LLC, Mountain View, CA (US)

(*) Notice: Subject to any disclaimer, the term of this patent is extended or adjusted under 35 U.S.C. 154(b) by 212 days.

(21) Appl. No.: 15/319,514

(22) PCT Filed: Jun. 17, 2014

(86) PCT No.: PCT/CN2014/080057
§ 371 (c)(1),
(2) Date: Dec. 16, 2016

(87) PCT Pub. No.: WO2015/192313
PCT Pub. Date: Dec. 23, 2015

(65) Prior Publication Data
US 2018/0210558 A1   Jul. 26, 2018

(51) Int. Cl.
*G06F 3/01* (2006.01)
*G06F 16/332* (2019.01)
(Continued)

(52) U.S. Cl.
CPC ............ *G06F 3/018* (2013.01); *G06F 3/0237* (2013.01); *G06F 16/3322* (2019.01);
(Continued)

(58) Field of Classification Search
None
See application file for complete search history.

(56) References Cited

U.S. PATENT DOCUMENTS

| 8,126,827 B2 | 2/2012 | Badger et al. |
| 8,364,462 B2 | 1/2013 | Joy et al. |
| (Continued) | | |

FOREIGN PATENT DOCUMENTS

| CN | 101487712 A | 7/2009 |
| CN | 101639863 A | 2/2010 |
| (Continued) | | |

OTHER PUBLICATIONS

Extended European Search Report dated Jan. 22, 2018 for EP Application No. 14895102.3, 8 pages.
(Continued)

*Primary Examiner* — Neeraj Sharma
(74) *Attorney, Agent, or Firm* — Dority & Manning, P.A.

(57) ABSTRACT

A computer-implemented method can include receiving, at a computing device having one or more processors, a user input in a first writing system. The method can include determining one or more candidates based on the user input that correspond to the user input represented in a second writing system different than the first writing system. The method can include determining whether at least one of the candidates corresponds to a proper name of a geographic location and, when at least one of the candidates corresponds to the proper name of the geographic location, determining a local name of the geographic location. The local name can be the proper name of the geographic location in a local language associated with the geographic location. The method can include augmenting the one or more candidates to include the local name to obtain an augmented candidate list, and outputting the augmented candidate list.

18 Claims, 5 Drawing Sheets

(51) Int. Cl.
*G06F 17/22* (2006.01)
*G06F 17/27* (2006.01)
*G06F 17/28* (2006.01)
*G06F 3/023* (2006.01)

(52) U.S. Cl.
CPC ........ *G06F 17/2223* (2013.01); *G06F 17/276* (2013.01); *G06F 17/278* (2013.01); *G06F 17/289* (2013.01)

(56) References Cited

U.S. PATENT DOCUMENTS

| | | | |
|---|---|---|---|
| 8,818,791 B2 | 8/2014 | Xiao et al. | |
| 8,949,125 B1* | 2/2015 | Chechik | G10L 13/02 704/243 |
| 9,262,408 B2* | 2/2016 | Tanaka | G06F 17/2809 |
| 9,332,380 B2 | 5/2016 | Fu | |
| 2003/0149557 A1* | 8/2003 | Cox | H04M 3/42229 704/2 |
| 2005/0060138 A1* | 3/2005 | Wang | G06F 3/018 704/1 |
| 2005/0216253 A1 | 9/2005 | Brockett | |
| 2010/0161311 A1* | 6/2010 | Massuh | G06F 17/289 704/7 |
| 2011/0301835 A1* | 12/2011 | Bongiorno | G01C 21/343 705/6 |
| 2012/0113011 A1 | 5/2012 | Wu et al. | |
| 2013/0159920 A1 | 6/2013 | Scott et al. | |
| 2013/0185054 A1 | 7/2013 | Xiao et al. | |
| 2014/0215330 A1* | 7/2014 | Lee | G09B 29/007 715/703 |
| 2014/0309806 A1* | 10/2014 | Ricci | B60Q 1/00 701/1 |
| 2015/0106702 A1* | 4/2015 | Scott | G06F 17/24 715/265 |
| 2016/0140147 A1* | 5/2016 | Sun | G06F 16/5838 707/772 |
| 2016/0210357 A1* | 7/2016 | Wohltman | G06F 16/9537 |

FOREIGN PATENT DOCUMENTS

| | | |
|---|---|---|
| CN | 102646022 A | 8/2012 |
| CN | 103455160 A | 12/2013 |
| CN | 103558908 A | 2/2014 |
| JP | 2004318639 A | 11/2014 |
| WO | 2014000267 A1 | 1/2014 |

OTHER PUBLICATIONS

PCT International Search Report and Written Opinion dated Feb. 27, 2015 for PCT International Application No. PCT/CN2014/080057, 9 pages.

* cited by examiner

INPUT METHOD EDITOR FOR INPUTTING NAMES OF GEOGRAPHIC LOCATIONS

CROSS-REFERENCE TO RELATED APPLICATIONS

This application is a 371 U.S. National Stage of International Application No. PCT/CN2014/080057, filed Jun. 17, 2014. The disclosure of the above application is incorporated herein by reference in its entirety.

FIELD

The present disclosure relates to an input method editor (IME) and, more particularly, an IME that permits a user to insert proper names of geographic locations in a local language.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user can utilize an input method editor (IME) to provide text input to a computing device, such as a mobile phone. An IME assists the user by providing the ability to input text in a writing system different from the writing system represented by the input device (e.g., keyboard) of the computing device. For example only, a Pinyin IME permits the input of Hanzi characters via a keyboard that displays Latin characters. In most cases, the writing systems utilized by the IME correspond to the same language. In the case of the Pinyin IME example, both the Pinyin and Hanzi writing systems correspond to the Chinese Mandarin language.

SUMMARY

In some embodiments of the present disclosure, a computer-implemented method is disclosed. The method can include receiving, at a computing device having one or more processors, a user input in a first writing system. The method can further include determining, at the computing device, one or more candidates based on the user input. Each of the one or more candidates may correspond to the user input represented in a second writing system different than the first writing system. Additionally, the method can include determining, at the computing device, whether at least one of the candidates corresponds to a proper name of a geographic location. When at least one of the candidates corresponds to the proper name of the geographic location, the method can include determining, at the computing device, a local name of the geographic location. The local name can be the proper name of the geographic location in a local language associated with the geographic location. The method can also include augmenting, at the computing device, the one or more candidates to include the local name to obtain an augmented candidate list, and outputting, from the computing device, the augmented candidate list.

In further example embodiments, the present disclosure relates to a computing device that includes one or more processors and a non-transitory, computer readable medium storing instructions that, when executed by the one or more processors, cause the computing device to perform operations. The operations can include receiving a user input in a first writing system. The operations can further include determining one or more candidates based on the user input. Each of the one or more candidates may correspond to the user input represented in a second writing system different than the first writing system. Additionally, the operations can include determining whether at least one of the candidates corresponds to a proper name of a geographic location. When at least one of the candidates corresponds to the proper name of the geographic location, the operations can include determining a local name of the geographic location. The local name can be the proper name of the geographic location in a local language associated with the geographic location. The operations can also include augmenting the one or more candidates to include the local name to obtain an augmented candidate list, and outputting the augmented candidate list.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, an IME can be utilized to provide text input to a computing device through the use of two different writing systems representative of the same language. In some situations, however, a user may desire to enter input text in a language with which she/he is unfamiliar. For example only, a user that is travelling in a foreign country may wish to visit a geographic location for which he/she does not know the local name. In the event that the user's computing device includes a map application or similar functionality, the user may be unable to properly input the local name of the geographic location via the IME. It would be desirable to provide an IME with additional functionality related to determining local names of geographic locations based on user input corresponding to a proper name of a geographic location in a non-local (or "foreign") language.

Figure 1:
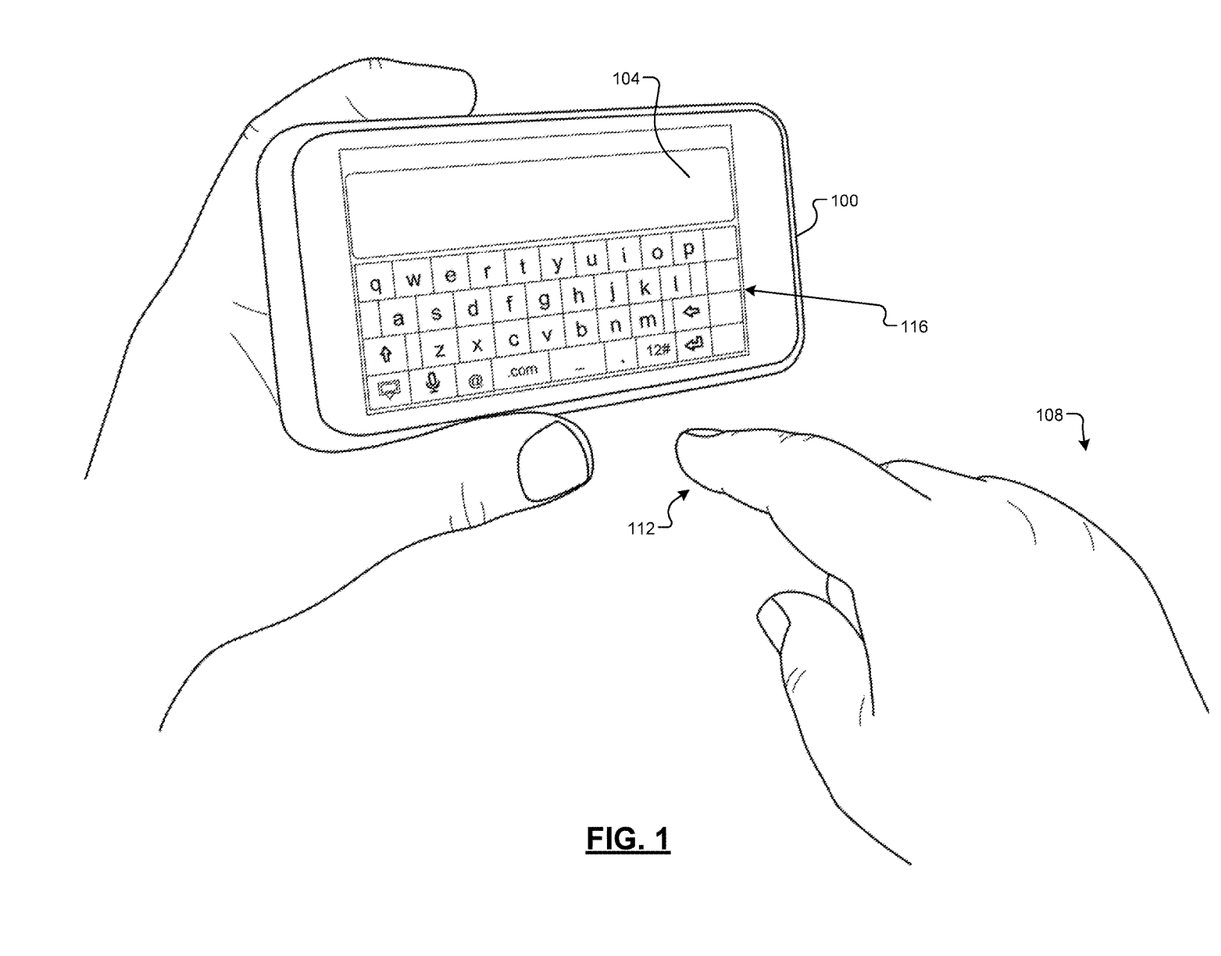
FIG. 1 illustrates a user interacting with an example computing device according to some implementations of the present disclosure.

Referring now to FIG. 1, an example computing device 100 is shown. The computing device 100 is illustrated as a mobile device (such as a mobile phone, a tablet computer or "phablet" computer), although it should be appreciated that the term "computing device" can include any form of computer(s) or computer system(s) that include one or more processors for executing instructions. For example only, a computing device can take the form of a desktop computer, a laptop computer, a mobile phone, a tablet computer, a phablet computer, a wearable computer (smartwatch, etc.), and a server or other distributed computer system, as well as two or more of these example computing devices working together to perform an operation.

The illustrated computing device 100 includes a display 104, such as a touch display as shown. The computing device 100 may additionally or alternatively include a physical keyboard (not shown). The touch display 104 may display information to, and receive input from, a user 108. A "soft" keyboard 116 may be provided on the display 104 through which the user 108 can provide text input. The illustrated keyboard is a Latin keyboard providing Latin alphabet characters, as well as other input options (numbers, a space bar, symbols, etc.). The user 108 may input text to the computing device 100 via the touch display 104 and/or keyboard 116 using one or more fingers 112, and a stylus or pen (not shown).

Figure 2:
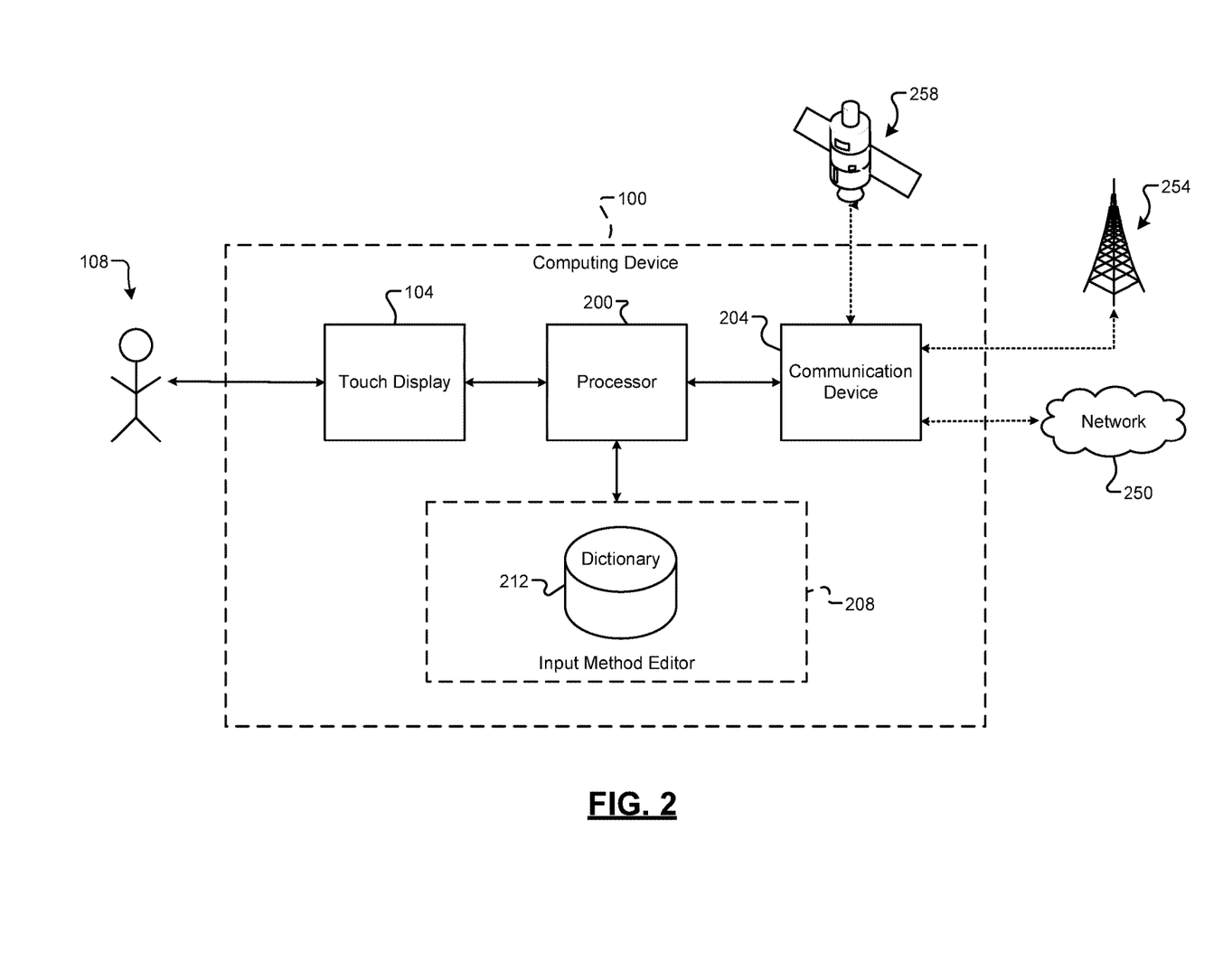
FIG. 2 is a functional block diagram of the computing device of FIG. 1 according to some implementations of the present disclosure.

Referring now to FIG. 2, a functional block diagram of the example computing device 100 is shown. The computing device 100 can include a processor 200 and a communication device 204. The term "processor" as used herein refers to both a single processor, as well as two or more processors operating together, e.g., in a parallel or distributed architecture, to perform operations of the computing device 100. The computing device 100 can further include an IME 208 that includes and utilizes a dictionary 212. While shown and described herein as separate components of the computing device 100, the IME 208 and the dictionary 212 can be implemented by the processor 200. It should be appreciated that the computing device 100 can include additional computing components that are not illustrated in FIG. 2, such as memory, a microphone, a speaker, one or more buttons and the like.

The processor 200 controls most operations of the computing device 100. For example, the processor 200 may perform tasks such as, but not limited to, loading/controlling the operating system of the computing device 100, loading/configuring communication parameters for the communication device 204, controlling IME parameters, and controlling memory storage/retrieval operations, e.g., for loading of the various parameters. Further, the processor 200 can control communication with the user 108 via the touch display 104 of the computing device 100.

The processor 200 may provide the user 108 with various different character input configurations via the touch display 104. For example, the processor 200 may provide the user 108 with a form of the standard Latin "QWERTY" keyboard as shown. Alternatively, the processor 200 may provide the user 108 with a standard 12-key configuration, also known as a T9-input based character configuration, or other keyboard configuration.

The processor 200 may receive input from the user 108, e.g., via the provided character input configuration. The processor 200, however, may also provide various IMEs, e.g., IME 208, to assist the user 108 with inputting text to the computing device 100. The processor 200, therefore, may also convert the input received from the user 108 to one or more desired scripts, e.g., Chinese Hanzi, by converting the user text input in a different script, e.g., in Pinyin. For example, the processor 200 may use the IME 208, in conjunction with the dictionary 212, when interpreting the user text input (described in detail below).

The communication device 204 controls communication between the computing device 100 and other devices/networks. For example only, the communication device 204 may provide for communication between the computing device 100 and other computing devices associated and/or the Internet. The computing device 100 may typically communicate via one or more of three communication mediums: a computing network 250, e.g., the Internet (hereinafter "the network 250"), a mobile telephone network 254, and a satellite network 258. Other communication mediums may also be implemented. For example, the communication device 204 may be configured for both wired and wireless network connections, e.g., radio frequency (RF) communication.

In some embodiments, the IME 208, alone or in combination with the dictionary 212, can provide functionality related to determining local names of geographic locations based on user input corresponding to a proper name of a geographic location in a non-local language. As mentioned, in certain circumstances a user 108 may desire to input a proper name of a geographic location in a local language with which the user 108 is unfamiliar. For example only, the user 108 may be a native Mandarin speaker that utilizes a Pinyin IME 208 to input text to the computing device 100. The user 108 may be travelling in Russia and desire to find directions to the Kremlin in Moscow utilizing a map application. The user 108, being unfamiliar with the Russian language and Cyrillic writing system, may not know the local name of this geographic location, which is "Кремль". The IME 208 can assist the user 108 to determine this local name, as further described below.

Figure 3:
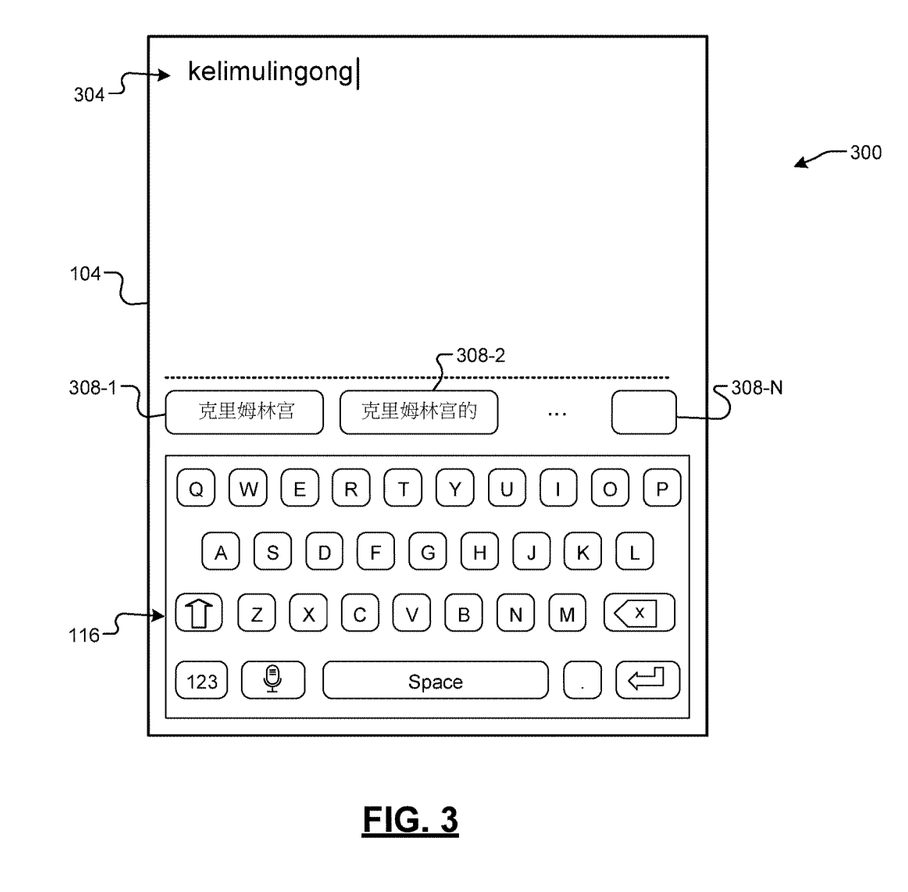
FIG. 3 is a schematic illustration of a user interface of the example computing device of FIGS. 1 and 2 according to some implementations of the present disclosure.
Figure 4:
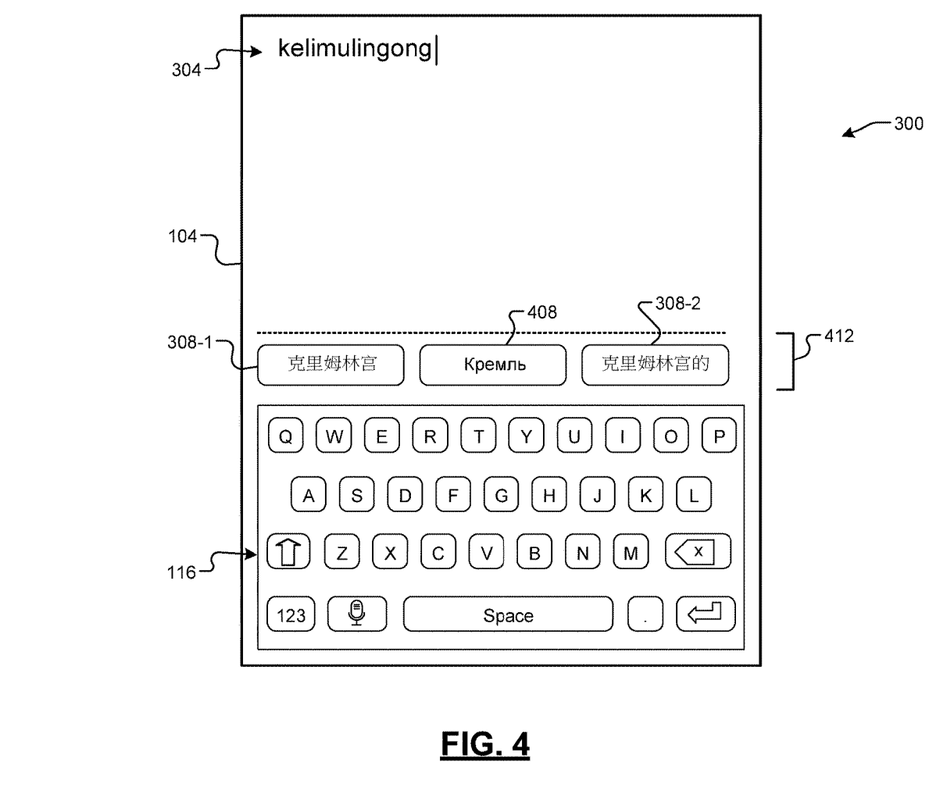
FIG. 4 is another schematic illustration of the user interface of FIG. 3 according to some implementations of the present disclosure.

Referring now to FIGS. 3 and 4, a user interface 300 of the computing device 100 is illustrated. The user interface 300 can be displayed on the display 104. The user interface 300 in FIG. 3 corresponds to the user 108 having provided a user input 304 (e.g., from the soft keyboard 116) of "kelimulingong" to the computing device 100. The user input 304 is in a first writing system, which corresponds to the Latin alphabet in this example. Based on the user input 304, the computing device 100 (via IME 208) can determine one or more candidates 308-1, 308-2 . . . 308-N (hereinafter referred to individually and collectively as "candidate(s) 308"). The one or more candidates 308 can correspond to the user input 304 represented in a second writing system different than the first writing system. In the illustrated example, the second writing system is Hanzi. In FIG. 3, there are two candidates shown ("克里姆林宫" 308-1 and "克里姆林宫 的" 308-2), although any number of candidates 308 could be displayed. The user input 304 and the one or more candidates 308 can be in the same language (a "first language").

The computing device 100/IME 208 can determine whether at least one of the candidates 308 corresponds to a proper name of a geographic location. In the present example, the candidate "克里姆林宫" 308-1 corresponds to the geographic location known in English as "the Moscow Kremlin" or "the Kremlin." For example only, the computing device 100 can determine whether at least one of the candidates 308 corresponds to a proper name of a geographic location by comparing each of the candidates 308 with entries in the dictionary 212 (the dictionary 212 is described more fully below). When a specific candidate 308 (which can also be referred to as a "specific candidate name") matches a specific entry in the dictionary 212, the computing device 100 can determine that the specific candidate 308 corresponds to a proper name of a geographic location.

Alternatively, the computing device 100 can determine whether at least one of the candidates 308 corresponds to a proper name of a geographic location by comparing a subset of the one or more candidates 308 with entries in the dictionary 212. The subset of the one or more candidates 308 can include a number of candidates 308 less than total amount of the one or more candidates 308 determined. For example only, the subset can include only those candidates 308 of the one or more candidates 308 that have a probability of matching the user input 304 greater than a threshold. In this example, the subset would include each specific candidate 308 of the one or more candidates 308 with a probability of matching the user input 304 greater than the threshold. The probability that a candidate 308 matches the user input 304 can be determined in a number of ways, e.g., through the use of a language model and/or a keyboard spatial input model by the IME 208. The probability can also be used, for example, to identify the most likely candidate or candidates 308 intended by the user 108 by providing the user input 304.

In yet another example, the computing device 100 can instead compare a specific number of candidates 308 (for example, the three most likely candidates) to the entries in the dictionary 212. It should be appreciated that, for some user input 304, there may not be more than one or two candidates 308 and that the specific number of candidates 308 will correspond to comparing all of the one or more candidates 308 to the entries in the dictionary 212 in some cases.

The dictionary 212 can include a plurality of geographic location names. Each entry in the dictionary 212 can correspond to one of the plurality of geographic location names and an associated local name of that geographic location. Using the example of "the Kremlin" discussed above, the dictionary 212 can include an entry of "Kremlin" in English associated with the local name of " Кремль " in Russian. The dictionary 212 can also include an entry for each of " 克里姆林宫 " in Mandarin associated with the local name of " Кремль " in Russian. The local name of the geographic location can be the proper name of the geographic location in a local language associated with the geographic location.

The dictionary 212 can be created by utilizing and/or leveraging one or more machine learning algorithms designed to identify entities (people, places, things, etc.) and associated characteristics thereof. Alternatively, the dictionary 212 can be created by a human being. In some embodiments, the dictionary 212 is created by a machine learning algorithm, and one or more human beings can modify and/or confirm the entries in the created dictionary 212. The local language(s) corresponding to each of the geographic locations can be determined in a similar manner. It should be appreciated that there may be more than one local language for a specific geographic location. For example only, in San Francisco, Calif. the local language may be English. In the Chinatown neighborhood of San Francisco, however, the local language may instead be Mandarin Chinese. Thus, the local language may be one or both of English or Chinese in this example. Such multilingual geographic locations can have multiple "local" languages, or one "local" language can be determined or selected for inclusion in the dictionary 212.

In some embodiments, the computing device 100 can determine whether at least one of the candidates 308 corresponds to a proper name of a geographic location by transmitting at least one of (or all of) the one or more candidates to a server computing device (not shown), e.g., via the communication device 204 and one or more of the networks (the network 250, the mobile telephone network 254, and the satellite network 258), and receiving an indication of whether at least one of the candidates corresponds to a proper name of a geographic location. The server computing device can be any form of computer(s) or computer system(s) that include one or more processors for executing instructions and that is in communication with the computing device 100. Furthermore, in some embodiments, the computing device 100 can determine the local name of the geographic location by receiving the local name of the geographic location from a server computing device. In this example, the server computing device 100 can store, implement and/or execute the functionality of the dictionary 212 described above.

When at least one of the candidates corresponds to a proper name of a geographic location, the computing device 100 can determine a local name 408 of the geographic location. In the illustrated example shown in FIG. 4, " Кремль " is identified as the local name 408 corresponding to the candidate " 克里姆林宫 " 308-1. The local name 408 can be in a different language (a "second language") different from the language (first language) of the user input 304 and the one or more candidates 308. As mentioned above, the local name 408 could be presented in more than one local language associated with the geographic location, e.g., in multilingual geographic locations.

The computing device 100 can augment the one or more candidates 308 to include the local name 408 to obtain an augmented candidate list 412. The augmented candidate list 412 can be output from the computing device 100, e.g., by being displayed on the touch display 104. Any form of output (displaying, a text-to-speech output via a speaker, etc.) could be utilized. The augmented candidate list 412 can include the one more candidates 308-1 to 308-N, as well as the local name 408 corresponding to the geographic location. In some embodiments, the one or more candidates 308 are ordered or ranked based on the probability that a candidate 308 matches the user input 304, e.g., the candidate 308 with the highest probability is listed first, the candidate 308 with the second highest probability is listed second, and so on.

The augmented candidate list 412 can also be ordered or ranked based on the probability of the candidates 308. In some embodiments, the local name 408 is included in the augmented candidate list 412 immediately proximate the candidate 308 that corresponds to the proper name of the geographic location. As shown in FIG. 4, for example, the local name " Кремль " 408 is immediately after the candidate " 克里姆林宫 " 308-1 to which it corresponds.

Figure 5:
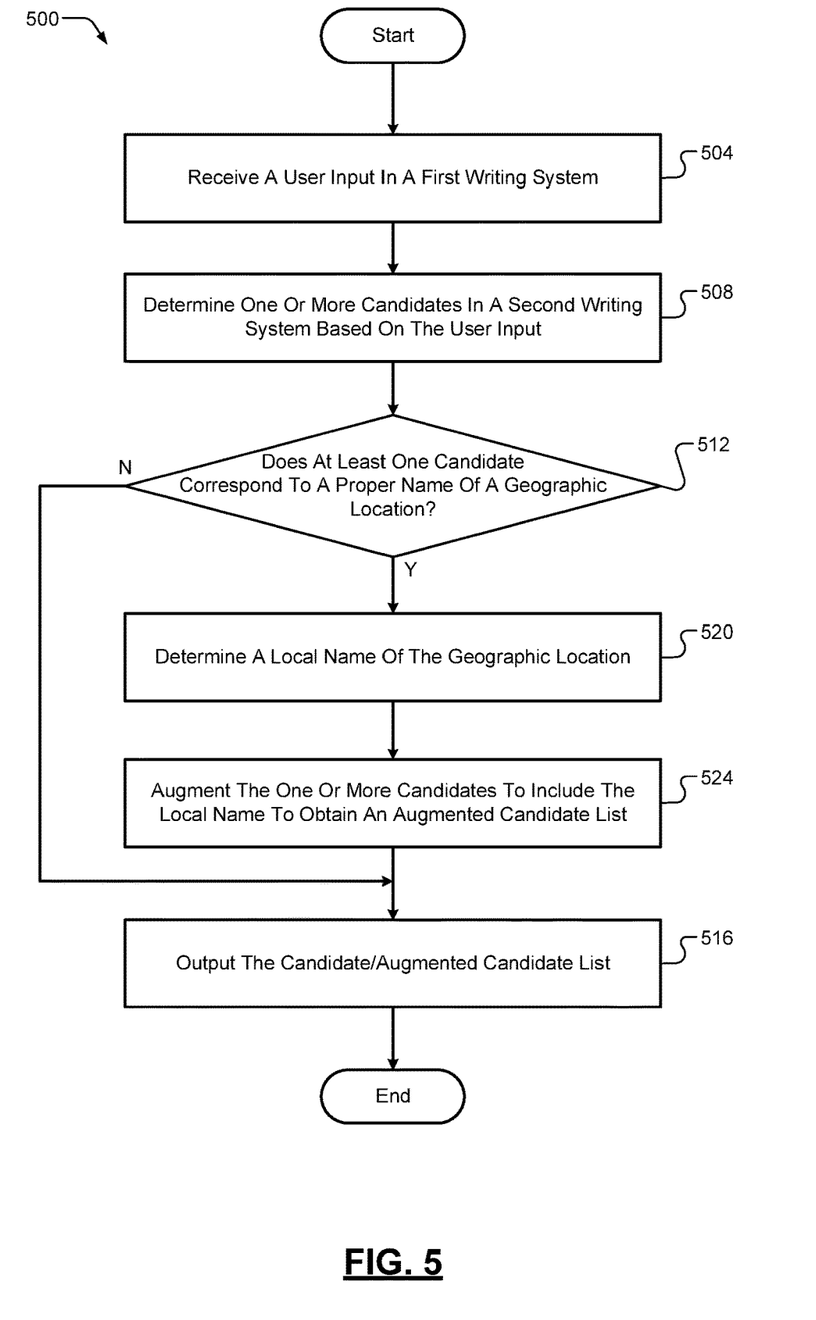
FIG. 5 is a flow diagram of an example method for determining local names of geographic locations based on a user input according to some implementations of the present disclosure.

Referring now to FIG. 5, a flow chart of an example method 500 according to some embodiments of the present disclosure is illustrated. The method 500 will be described in association with the computing device 100 and techniques described above, but it should be appreciated that any computing device(s) could perform the example method 500. At 504, the computing device 100 receives a user input (such as user input 304) in a first writing system. At 508, the computing device 100 determines, based on the user input, one or more candidates (such as candidates 308) in a second writing system different from the first writing system. As mentioned above, the user input (user input 304) and the one or more candidates (candidates 308) can be in the same language (a "first" language).

At 512, the computing device 100 determines whether at least one of the candidates 308 corresponds to a proper name of a geographic location. As described above, this determination can be performed, e.g., by comparing at least one of the one more candidates 308 to entries in a dictionary (such as dictionary 212). When none of the candidates 308 corresponds to a proper name of a geographic location, at 516 the computing device 100 can output a candidate list that includes some or all of the one or more candidates 308.

When at least one of the candidates 308 corresponds to a proper name of a geographic location at 512, the computing device 100 can determine a local name 408 of the geographic location at 520. At 524, the computing device 100 can augment the one or more candidates to include the local name 408 to obtain an augmented candidate list 412, which is then output by the computing device 100 at 516. The method 500 can then end or return to 504 for more cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for outputting a local name of a geographic location, for input into an application, based on user input in a first language that is a non-local language, comprising:
receiving, at a computing device having one or more processors, a user input, the user input being in a first writing system;
determining, at the computing device, one or more candidates based on the user input, each of the one or more candidates corresponding to the user input represented in a second writing system different than the first writing system;
determining, at the computing device, whether at least one of the candidates corresponds to a proper name of a geographic location;
when at least one of the candidates corresponds to the proper name of the geographic location, determining, at the computing device, the local name of the geographic location, the local name being the proper name of the geographic location in a local language associated with the geographic location, wherein the user input and the one or more candidates are in the first language, and the local name is in a second language different than the first language;
augmenting, at the computing device, the one or more candidates to include the local name of the geographic location to obtain an augmented candidate list; and
outputting the augmented candidate list including the local name of the geographic location, wherein the local name of the geographic location is provided to be input into the application.

2. The computer-implemented method of claim 1, wherein determining whether at least one of the candidates corresponds to a proper name of a geographic location comprises comparing each of the one or more candidates with entries in a dictionary, wherein a specific candidate name corresponds to the proper name of the geographic location when the specific candidate name matches a specific entry in the dictionary.

3. The computer-implemented method of claim 2, wherein the dictionary includes a plurality of geographic location names, each entry in the dictionary corresponding to one of the plurality of geographic location names and an associated local name of the geographic location.

4. The computer-implemented method of claim 1, wherein determining whether at least one of the candidates corresponds to a proper name of a geographic location comprises comparing each of a subset of the one or more candidates with entries in a dictionary, wherein a specific candidate name corresponds to the proper name of the geographic location when the specific candidate name matches a specific entry in the dictionary.

5. The computer-implemented method of claim 4, wherein the subset of the one or more candidates includes each specific candidate of the one or more candidates with a probability of matching the user input greater than a threshold.

6. The computer-implemented method of claim 1, wherein the augmented candidate list includes at least one of the one or more candidates and the local name.

7. The computer-implemented method of claim 1, wherein determining whether at least one of the candidates corresponds to a proper name of a geographic location comprises:
transmitting at least one of the candidates to a server computing device; and
receiving an indication of whether at least one of the candidates corresponds to the proper name of the geographic location.

8. The computer-implemented method of claim 7, wherein determining the local name of the geographic location comprises receiving the local name of the geographic location from the server computing device.

9. The computer-implemented method of claim 1, wherein:
determining whether at least one of the candidates corresponds to a proper name of a geographic location comprises:
transmitting the one or more candidates to a server computing device, and
receiving an indication of whether at least one of the candidates corresponds to the proper name of the geographic location; and
determining the local name of the geographic location comprises receiving the local name of the geographic location from the server computing device.

10. A computing device for outputting a local name of a geographic location, for input into an application, based on user input in a first language that is a non-local language, comprising:
one or more processors; and
a non-transitory, computer readable medium storing instructions that, when executed by the one or more processors, cause the computing device to perform operations comprising:
receiving a user input, the user input being in a first writing system;
determining one or more candidates based on the user input, each of the one or more candidates corresponding to the user input represented in a second writing system different than the first writing system;

determining whether at least one of the candidates corresponds to a proper name of a geographic location;

when at least one of the candidates corresponds to the proper name of the geographic location, determining the local name of the geographic location, the local name being the proper name of the geographic location in a local language associated with the geographic location, wherein the user input and the one or more candidates are in the first language, and the local name is in a second language different than the first language;

augmenting the one or more candidates to include the local name of the geographic location to obtain an augmented candidate list; and outputting the augmented candidate list including the local name of the geographic location, wherein the local name of the geographic location is provided to be input into the application.

11. The computing device of claim 10, wherein determining whether at least one of the candidates corresponds to a proper name of a geographic location comprises comparing each of the one or more candidates with entries in a dictionary, wherein a specific candidate name corresponds to the proper name of the geographic location when the specific candidate name matches a specific entry in the dictionary.

12. The computing device of claim 11, wherein the dictionary includes a plurality of geographic location names, each entry in the dictionary corresponding to one of the plurality of geographic location names and an associated local name of the geographic location.

13. The computing device of claim 10, wherein determining whether at least one of the candidates corresponds to a proper name of a geographic location comprises comparing each of a subset of the one or more candidates with entries in a dictionary, wherein a specific candidate name corresponds to the proper name of the geographic location when the specific candidate name matches a specific entry in the dictionary.

14. The computing device of claim 13, wherein the subset of the one or more candidates includes each specific candidate of the one or more candidates with a probability of matching the user input greater than a threshold.

15. The computer-implemented method of claim 10, wherein the augmented candidate list includes at least one of the one or more candidates and the local name.

16. The computing device of claim 10, wherein determining whether at least one of the candidates corresponds to a proper name of a geographic location comprises:

transmitting at least one of the candidates to a server computing device; and receiving an indication of whether at least one of the candidates corresponds to the proper name of the geographic location.

17. The computing device of claim 16, wherein determining the local name of the geographic location comprises receiving the local name of the geographic location from the server computing device.

18. The computing device of claim 10, wherein:

determining whether at least one of the candidates corresponds to a proper name of a geographic location comprises:

transmitting the one or more candidates to a server computing device, and receiving an indication of whether at least one of the candidates corresponds to the proper name of the geographic location; and determining the local name of the geographic location comprises receiving the local name of the geographic location from the server computing device.

* * * * *